(12) United States Patent  
Alleyne et al.

(10) Patent No.: US 8,537,671 B2  
(45) Date of Patent: Sep. 17, 2013

(54) HIERARCHICAL PACKET POLICER

(75) Inventors: Brian Alleyne, Los Gatos, CA (US);  
Sunden Chen, San Jose, CA (US);  
Ramanathan Lakshmikanthan, Santa Clara, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 260 days.

(21) Appl. No.: 12/983,111

(22) Filed: Dec. 31, 2010

(65) Prior Publication Data  
US 2012/0170450 A1    Jul. 5, 2012

(51) Int. Cl.  
G01R 31/08 (2006.01)  
G06F 11/00 (2006.01)  
G08C 15/00 (2006.01)  
H04J 1/16 (2006.01)  
H04J 3/14 (2006.01)  
H04L 1/00 (2006.01)  
H04L 12/26 (2006.01)

(52) U.S. Cl.  
USPC ........... 370/230; 370/254; 370/232; 370/386; 370/231; 370/234; 370/235; 370/236; 709/220; 709/221; 709/222; 709/224; 709/225; 709/239

(58) Field of Classification Search  
None  
See application file for complete search history.

(56) References Cited

U.S. PATENT DOCUMENTS

| | | | |
|---|---|---|---|
| 7,042,848 B2 | 5/2006 | Santiago et al. | |
| 7,664,022 B2 * | 2/2010 | Hu | 370/230 |
| 7,664,028 B1 | 2/2010 | Gingras et al. | |
| 7,668,087 B2 * | 2/2010 | Hussain et al. | 370/230 |
| 2002/0186661 A1 | 12/2002 | Santiago et al. | |

OTHER PUBLICATIONS

MEF Technical Specification MEF 10.1, Ethernet Services Attributes Phase 2, Nov. 2006, The Metro Ethernet Forum 2006, 65 pages.  
MEF Technical Specification MEF 10.2, Ethernet Services Attributes Phase 2, Oct. 27, 2009, The Metro Ethernet Forum 2009, 65 pages.  
Heinanen, J., et al., "A Single Rate Three Color Marker," rfc2697, Network Working Group, Request for Comments: 2697, Sep. 1999, pp. 1-6.  
Heinanen, J., et al., "A Two Rate Three Color Marker," rfc2698, Network Working Group, Request for Comments: 2698, Sep. 1999, pp. 1-5.  
Aboul-Magd,O., et al., "A Differential Service Two-Rate, Three-Color Marker with Efficient Handling of in-Profile Traffic," rfc4115, Network Working Group, Request for Comments: 4115, Jul. 2005, pp. 1-6.

* cited by examiner

*Primary Examiner* — Ian N Moore  
*Assistant Examiner* — Eric H Wang  
(74) *Attorney, Agent, or Firm* — Blakely Sokoloff Taylor & Zafman LLP

(57) ABSTRACT

Embodiments of the invention include a method performed in a packet processor core for policing a packet through a hierarchical policer coupled to one or more policing requestors. The hierarchical policer has a plurality of meter levels including an initial level and one or more subsequent levels. The hierarchical policer creates a meter result at the meter of each meter level using packet characteristics and a meter state for that meter level. The hierarchical policer generates meter level outputs that classify the packet for each meter level and for at least one of the subsequent levels the meter level output is based on the meter level output from a previous meter level. The hierarchical policer performs a meter combine operation that produces a final packet output attribute from the combination of the meter level outputs. The hierarchical policer returns the final packet output attribute to a policing requestor.

14 Claims, 7 Drawing Sheets ions of the invention relate generally to the field
HIERARCHICAL PACKET POLICER

FIELD OF THE INVENTION

Embodiments of the invention relate generally to the field of telecommunications; and more particularly, to quality of service in packet based communication networks.

BACKGROUND

Quality of Service (QoS) is an evolving technology in today's networking infrastructure. It allows the networks to provide different levels of services for different types of network traffic. Packet policing is one of the important elements used extensively to support a QoS framework. Packet policing refers to the per packet analysis of whether each packet adheres to the QoS requirements of a network element.

Packet policing involves measuring the traffic rate against specified rates of the traffic type and taking specified actions based on the measured results. There are several industry specifications defining how policing operations can be performed. Examples of these specifications are Internet Engineering Task Force (IETF) Request for Comments (RFC) 2697, RFC 2698, and RFC 4115 and Metro Ethernet Forum (MEF) 10.2. All of these documents describe how individual policing operations may be performed. Varying communicating protocols utilize different methods and specifications for implementing packet policing. For example, internet protocol (IP) packet policing may utilize RFC 4115, "A Differentiated Service, Two-Rate, Three-Color Marker with Efficient Handling of in-Profile Traffic" (July 2005), describes "a two-rate, three-color marker" for traffic metering and marking. The RFC describes a packet marker that classifies a packet into RED, YELLOW, or GREEN categories according to the size of the packet and the current state of token buckets used in a packet meter. For instance, one token bucket may track the committed information rate while another token bucket may track the excess information rate. The network element may then react to the classification by dropping all RED packets, transmitting YELLOW packets according to a best effort, and transmitting GREEN packets with a low probability of drop.

As the network infrastructure evolves over time, the complexity of policing operation also increases. One example is to allow one or multiple policing operations be performed on a single packet. When multiple policing operations are performed on a packet, the action taken on the packet may vary depending on configuration of the network, customer desires, or technological requirements.

One prior art solution is to configure the packet policing operation entirely in software to provide flexibility in the configuration of the policing operations. However, as the data rate of a network increases the performance of a pure software solution cannot keep up with the increasing data rate. Another prior art solution is to implement specific packet policing configurations in hardwired logic. In this solution, the hardware is fast enough to keep up with the increasing data rates, but the hardware does not have the flexibility to adapt to varied configurations and changing requirements.

SUMMARY OF THE INVENTION

Embodiments of the invention include a method performed in a packet processor core for policing a packet through a hierarchical policer coupled to one or more policing requestors. The hierarchical policer has a plurality of meter levels including an initial level and one or more subsequent levels. The hierarchical policer receives a policer request to perform hierarchical policing from the policing requestor. The policer request comprises packet characteristics and identifies request configuration information. The hierarchical policer creates a meter result at the meter of each meter level using the packet characteristics and a meter state for that meter level specified by the request configuration information. The hierarchical policer generates, at each meter level, a meter level output that includes a meter level output packet attribute that classifies the packet and a set of one or more meter token state update indicators. The meter level output is based on the meter result for that level and a portion of the request configuration information. For at least one of the subsequent levels the meter level output is further based on the meter level output packet attribute from a previous meter level. The hierarchical policer performs a meter combine operation comprising the steps of producing a final packet output attribute and producing a set of one or more meter state updates. The step of producing a final packet output attribute that classifies the packet uses at least one of the plurality of meter level output packet attributes and a portion of the request configuration information. The step of producing a set of one or more meter state updates that indicate changes to one or more meter states uses at least one of the plurality of sets of meter token state update indicators and a portion of the request configuration information. The hierarchical policer processes the set of meter state updates where one or more meter states are changed as indicated by the meter state updates. The hierarchical policer returns the final packet output attribute to the policing requestor. The advantage of this method being that hierarchical policing may be implemented in hardware but configured in a flexible manner by the policing requestors.

Embodiments of the invention include a hierarchical policer module, coupled to one or more policing requestors, to police a packet through hierarchical packet policing. The hierarchical policer module comprises a policer control module, a hierarchical meter result module, and a meter combine module. The policer control module is configured to receive policer requests originating from the policing requestors, each policer request to include packet characteristics and to include request configuration information. The policer control module further configured to retrieve a plurality of meter states, each meter state specified by the request configuration information and comprised of meter tokens that indicate an amount of available resources for that meter state. The policer control module further configured to transmit the plurality of meter states and the packet characteristics to the hierarchical meter result module and the meter combine module. The policer control module is further configured to transmit a policer response, which indicates a packet classification, to the policing requestor. The hierarchical meter result module, coupled to the policer control module, to be configured to chain together a plurality of meter levels including an initial level and one of more subsequent levels. The chain of meter levels to be configured according to the request configuration information. Each meter level configured to generate a meter result for that level with one of the plurality of meter states and a portion of the packet characteristics. Each meter level further configured to generate a meter level output based on, at least in part, the meter result and a portion of the request configuration information. The meter level output to include a meter level output packet attribute to classify the packet and a set of one or more meter token state update indicators. Each meter level further configured to generate a set of one or more meter state updates with at least one of the sets of meter token state update indicators; each meter state update to indicate changes to one or more meter states. The advantage of this hierarchical policer module being that hierarchical policing may be implemented in hardware but configured in a flexible manner by the policing requestors.

Embodiments of the invention include a method performed in a hierarchical policer module for configuring a hierarchy of meter levels. The hierarchy of meter levels includes an initial level and one or more subsequent levels. The hierarchical policer module receiving a hierarchical policer request including information identifying a meter profile for each of the meter levels. The hierarchical policer module retrieving a plurality of meter profiles identified by the policer request. The hierarchical policer module configuring the hierarchy of meter levels according to the plurality of meter profiles. The configuration of the hierarchy of meter levels is made so that the hierarchical policer module uses, at one or more of the subsequent levels, a meter level output from a previous meter as part of a meter level output generation for that level. The advantage of this method being that hierarchical policing may be implemented in hardware but configured in a flexible manner by the policing requestors.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The invention may best be understood by referring to the following description and accompanying drawings that are used to illustrate embodiments of the invention. In the drawings.

DETAILED DESCRIPTION

The following description describes methods and apparatus for hierarchical packet policing implemented in hardware but flexibly configured by packet policing requests. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Embodiments of the invention are directed to a system and method for packet policing packets through multiple levels of meters in a network element. The system provides a mechanism for implementing a series of meters in hardware but allowing for the configuration of how the levels interact and combine with one another to occur in software; the configuration is provided by each request to perform packet policing. Thus the system has the performance benefit of implementing hierarchical packet policing in hardware but has the flexibility benefit of configuring the packet policing in software.

Figure 1:
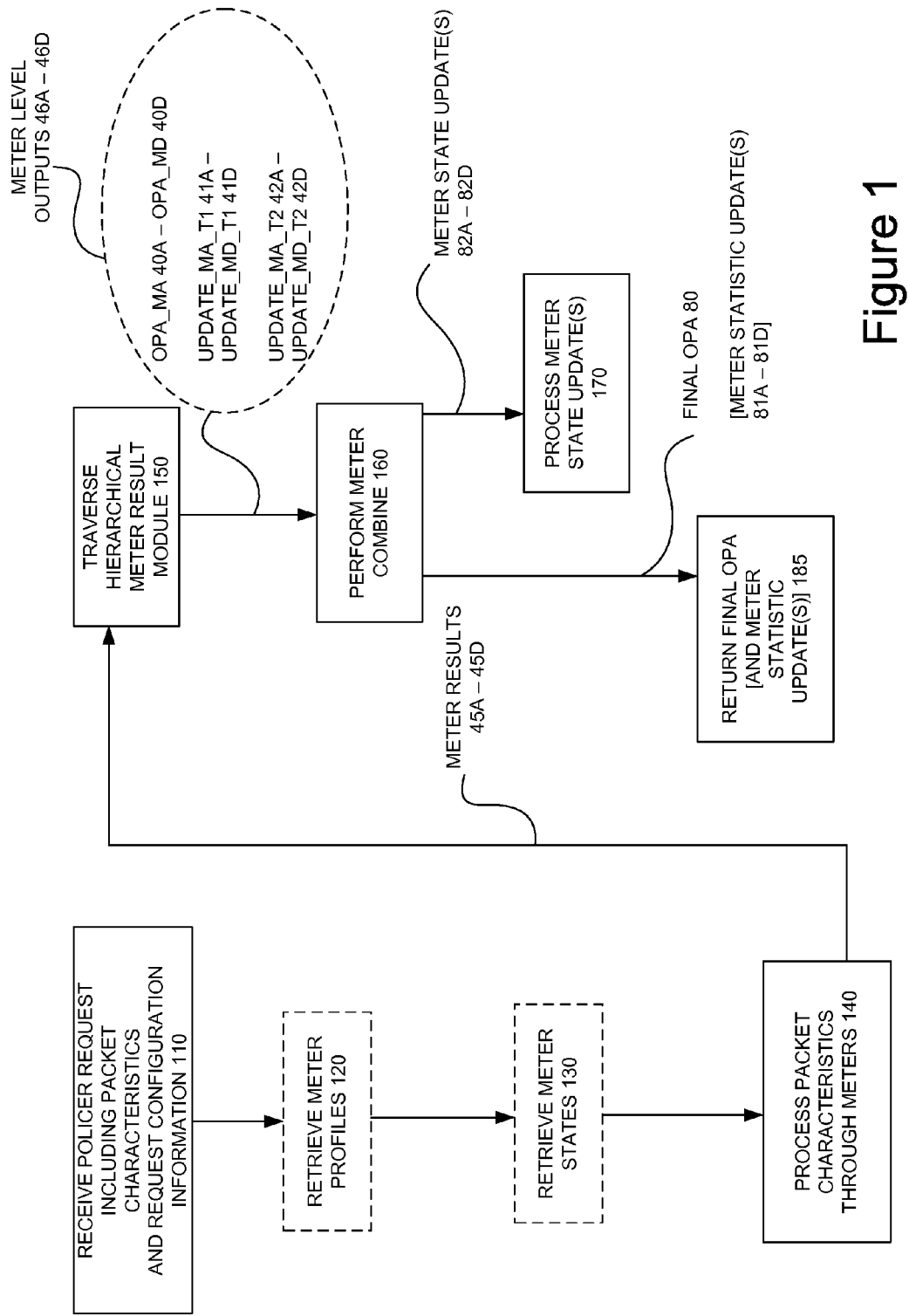
FIG. 1 is a flow chart illustrating a method for performing hierarchical packet policing according to embodiments of the invention.

FIG. 1 illustrates a flow chart of a method for performing hierarchical packet policing according to embodiments of the invention. This figure includes steps that are optional depending on the specific implementation and such steps are shown with dashed boxes. A policer request is received (Block 110) including packet characteristics 308 and request configuration information. In one embodiment, a plurality of meter profiles 30A-30D, identified by the request configuration information, are retrieved (Block 120) from a meter profile table 230. In a further embodiment, a plurality of meter states 295A-295D are retrieved (Block 130) from either a meter state memory 290 or meter state cache 225. The optional steps (Block 120 and Block 130) may be utilized together in embodiments of the invention.

The packet characteristics 308 are then processed (Block 140) through meters 320A-320D, each meter corresponding to a meter level A-D, to produce meter results 45A-45D. Although four meter results 45A-45D are indicated by FIG. 1, it should be understood that the number of meter results 45 corresponds to the number of meter levels used in a hierarchical meter result module 235. Furthermore, though the figures show four levels in an exemplary fashion the invention is not limited to embodiments with four levels.

Figure 4:
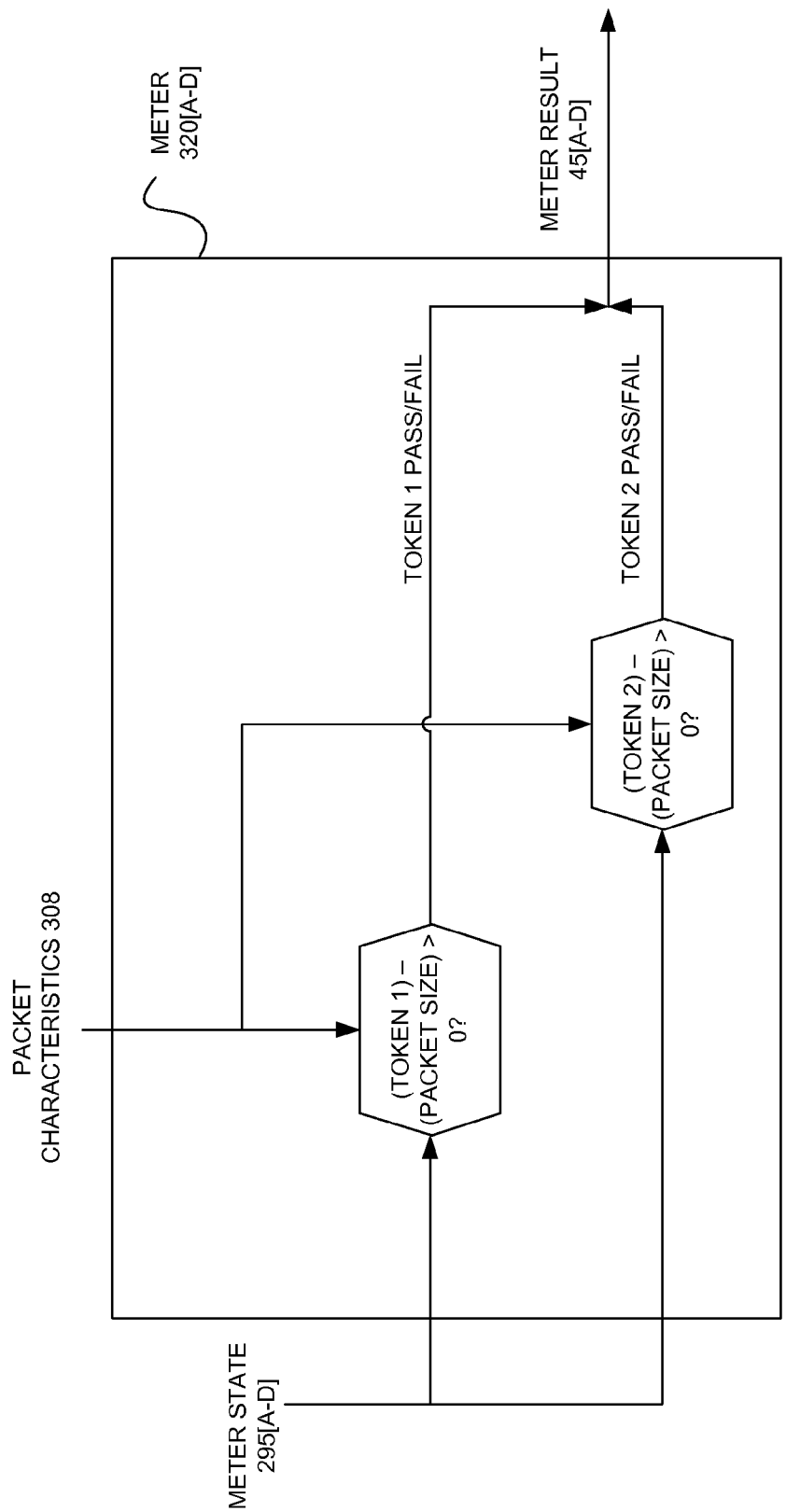
FIG. 4 is a block diagram illustrating a packet meter used by one of the plurality of meter levels according to embodiments of the invention.

In one embodiment, the meters 320A-320D operate as illustrated by FIG. 4. FIG. 4 is a block diagram illustrating a packet meter 320 used by one of the plurality of meter levels according to embodiments of the invention (e.g. the packet meters 320A-320D). The meter 320 receives a corresponding meter state 295 and the packet characteristics 308. In one embodiment, the packet characteristics 308 include a packet size corresponding to the packet being policed. It is desirable to allow a variety of metering algorithms, therefore embodiments allow for the meter states 295A-295N to track different pieces of measurement information for each meter state. In one embodiment, one of the meter states 295A-295N includes tokens to track a committed information rate (CIR) and an excess information rate (EIR). In another embodiment, one of the meter states 295A-295N includes tokens to track committed burst size (CBS) and excess burst size (EBS). In still another embodiment, one of the meter states 295A-295N includes tokens to track packet information rate (PIR) and a peak burst size (PBS). In one embodiment, meter state 295A includes tokens for the CIR and the EIR, meter state 295B includes tokens for the CBS and the EBS, and meter state 295C includes tokens for the PIR and the PBS. It should be noted that tokens for the different pieces of measurement information may be mixed and matched into different combinations in the meter states according to the design needs of the network element. Further, in one embodiment the meter state 295A and the meter 320A includes more than two tokens and more than two meter tests respectively.

In FIG. 4, meter 320A checks the packet size against the tokens contained within the received meter state 295A. The meter 320A generates a meter result 45A that indicates the result of each check against each token. In one embodiment, the meter result 45A indicates whether the subtraction of the packet size from each token is greater than zero. If the result of the subtraction is greater than zero then the result for the check against that token is a pass otherwise the result for that token is a fail. The result of each check against the tokens is aggregated into meter result 45A. In another embodiment, the meter 320A checks whether each token is greater than the packet size, indicating a pass, and aggregates the result into meter result 45A. Meter results 45B-45D are generated by meters 320B-320D in the same manner as meter 320A. In one embodiment, meter 320A checks the packet size against two tokens and generates a two bit meter result 45A. While in another embodiment, the meter 320A checks the packet size again N tokens and generates an N bit meter result 45A.

Referring back to FIG. 1, the meter results 45A-45D are used to traverse (Block 150) the hierarchical meter result module 235 and produce a plurality of meter level outputs 46A-46D. The meter level outputs 46A-46D include a set of one or more meter level output packet attributes 40A-40D and a plurality of sets of one or more meter token state update indicators 41A-41D and 42A-42D. The meter level outputs 46A-46D are used to perform a meter combine (Block 160) that generates a set of one or more meter state updates 82A-82D and a final output packet attribute 80. In one embodiment, the meter combine step (Block 160) further generates a set of meter statistic updates 81A-81D (shown as optional by brackets in FIG. 1). The meter state updates 82A-82D are processed (Block 170) to update one or more meter states. The final output packet attribute 80, and optionally the meter statistic updates 81A-81D, is returned (Block 185) to a policer requestor 201.

Figure 2:
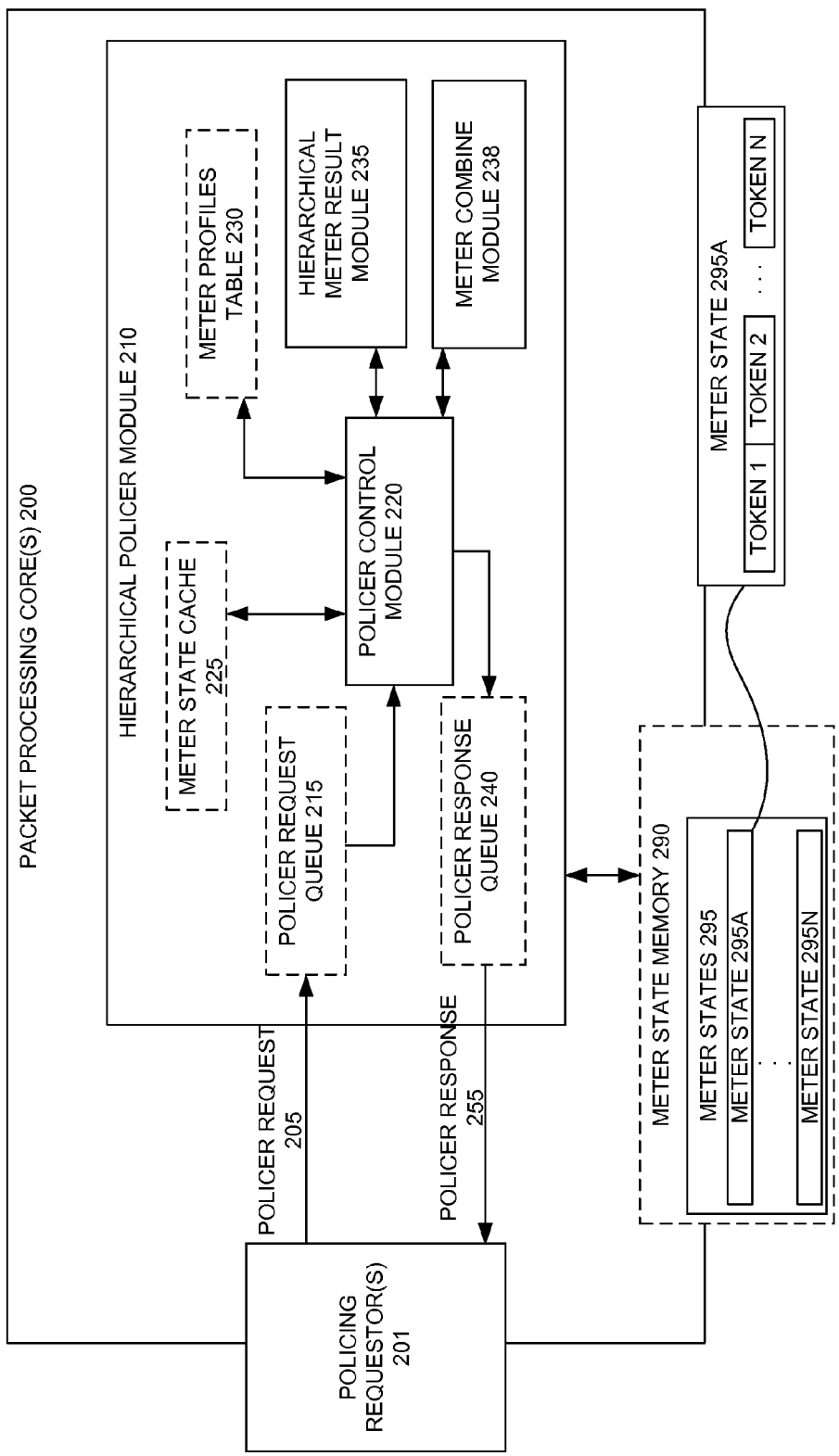
FIG. 2 is a block diagram illustrating a system including at least one policing requestor and at least one packet processing core that includes a hierarchical policer module in which packets are processed through a hierarchy of meter levels according to embodiments of the invention.

FIG. 2 is a block diagram illustrating a system including at least one policing requestor and at least one packet processing core that includes a hierarchical policer module in which packets are processed through a hierarchy of meter levels according to embodiments of the invention. In FIG. 2, some modules are optional and are shown with dashed boxes as such. FIG. 2 illustrates a set of packet processing cores 200 coupled to one or more policing requestors 201; in one embodiment a plurality of packet processing cores 200 are coupled together and further coupled to the plurality of policing requestors 201. In another embodiment, the policing requestors 201 are a module included within the packet processor cores 200.

In FIG. 2, the packet processor cores 200 include a hierarchical policer module 210 that is coupled to the policing requestors 201. In FIG. 2, the hierarchical policer module 210 is configured to communicate with the policer requestors 201 to receive policer requests 205 and transmit policer responses 255. As described above, the policer requests 205 includes packet characteristics 308 and request configuration information. In one embodiment, the policer response 255 includes a final output packet attribute 80 typically marking a packet GREEN, YELLOW, or RED. While in another embodiment, the policer response 255 includes a final output packet attribute 80 and a set of one or more meter statistic updates 81A-81D that indicate updates to one or more sets of statistics associated with the requested meter levels. For example, the request configuration information may configure four meter levels that are processed to generate the policer response 255. The policer response 255 would then include meter statistic updates 81A-81D that indicate how statistics for each of the identified meter levels should be updated; e.g. for each level whether GREEN, YELLOW, or RED statistics should be incremented. The statistics track the number of packets falling into each category.

The hierarchical policer module 210 is further coupled to meter state memory 290. The meter state memory 290 may be included as part of the packet processor cores 200 or may be external to the packet processing cores 200. The meter state memory 290 stores a plurality of meter states 295. In one embodiment, the hierarchical policer module 210 further includes a meter state cache 225 shown in dashed lines. In this embodiment, the policer control module 220 checks for the presence of a meter state 295A, identified by the policer request 205, in the meter state cache 225. If the identified meter state 295A is not in the meter state cache 225, then the policer control module 220 retrieves the meter state 295A from among a plurality of meters states 295A-295N in the meter state memory 290 and stores the meter state 295A in the meter state cache 225.

The hierarchical policer module 210 includes a policer control module 220 that is coupled to the hierarchical meter result module 235 and a meter combine module 238. In one embodiment the policer control module 220 receives the meter level outputs 46A-46D from the hierarchical meter result module 235. In turn, the policer control module 220 communicates the meter level outputs 46A-46D to the meter combine module 238. In another embodiment, the hierarchical meter result module 235 communicates the meter level outputs 46A-46D to the meter combine module 238.

In one embodiment, the hierarchical policer module 210 further includes a policer request queue 215 and a policer response queue 240, each coupled to the policer control module 220 and shown in dashed lines. The policer request queue 215 is configured to receive policer request 205 and the policer response queue 240 is configured to hold policer responses 255 until they are communicated to the corresponding policing requestor 201. In at least one embodiment, the hierarchical policer module 210 is one module in a chain of modules performing packet processing in the packet processing cores 200. In this embodiment the hierarchical policer module 210 receives policer requests 205 that instruct the hierarchical policer module 210 to perform policing and pass the result onto the next module in the chain.

In one embodiment, the hierarchical policer module 210 further includes a meter profiles table 230. The meter profiles table 230 stores a plurality of sets of configuration information (i.e. meter profile) to be used by each meter level in the hierarchical meter result module 235. In this embodiment, the policer request 205 includes information that identifies one or more meter profiles 30A-30D to be used for that policer request. The policer control module 220 retrieves the requested meter profiles 30A-30D from the meter profiles table 230. The meter profiles 30A-30D can then be used to configure the hierarchical meter result module 235. In one embodiment, the meter profiles are identified in the meter profiles table 230 by an algorithm identifier while in other embodiments a numerical index is used to identify the desired meter profile. Furthermore, in one embodiment the meter profiles 30A-30D include information specifying a meter type 302, a meter input packet attribute select 304, and a color mode select 305. While in other embodiments, the meter profiles 30A-30D include more or less information such as identifying a meter state 295A to be used by the meter level using that meter profile. The usage of the meter profiles by the meter levels is described below.

Figure 3A:
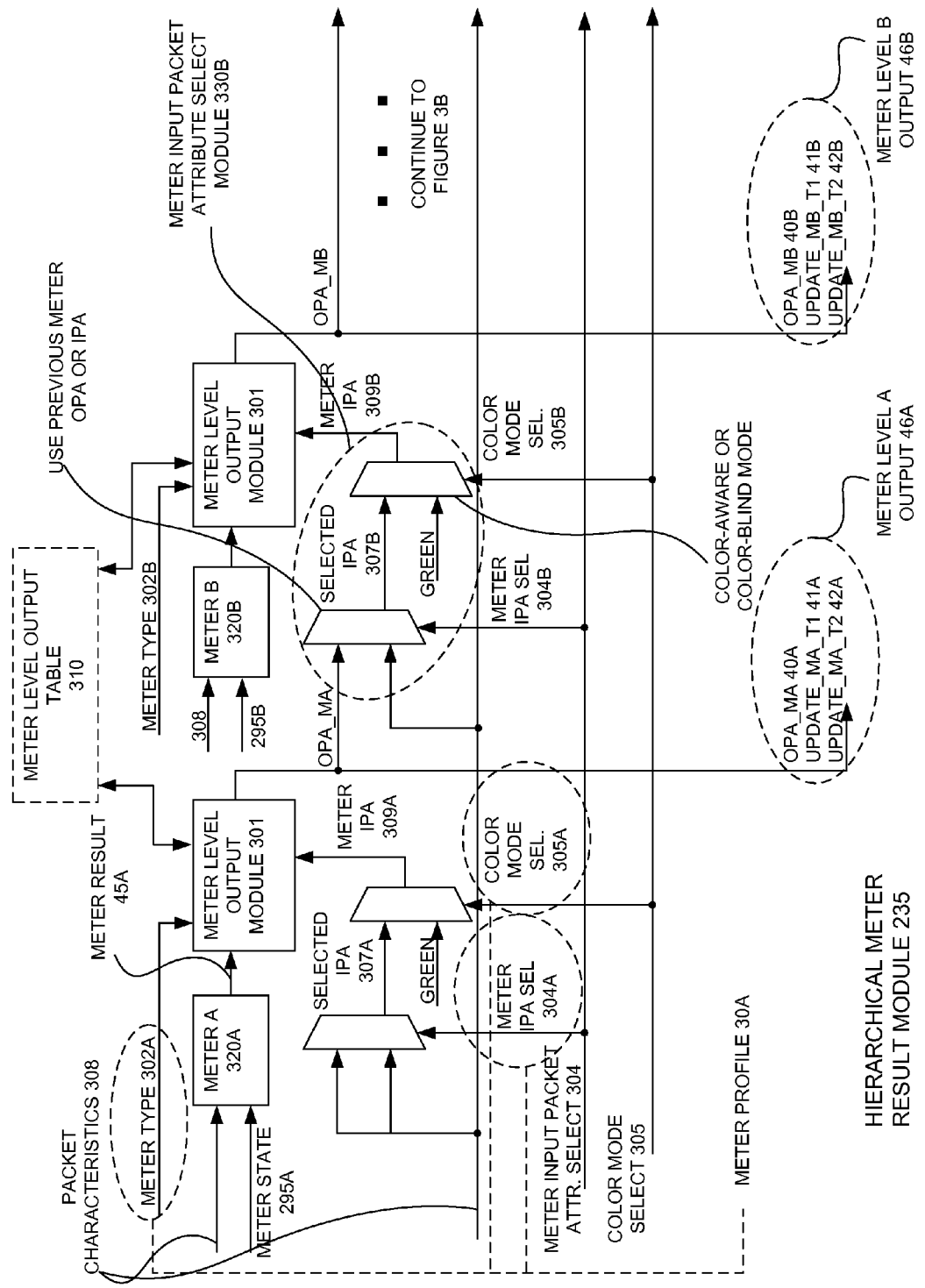
FIGS. 3A and 3B are block diagrams illustrating a plurality of levels of a hierarchical meter result module to be configured into a hierarchy of meter levels according to a packet policing request according to embodiments of the invention.
Figure 3B:
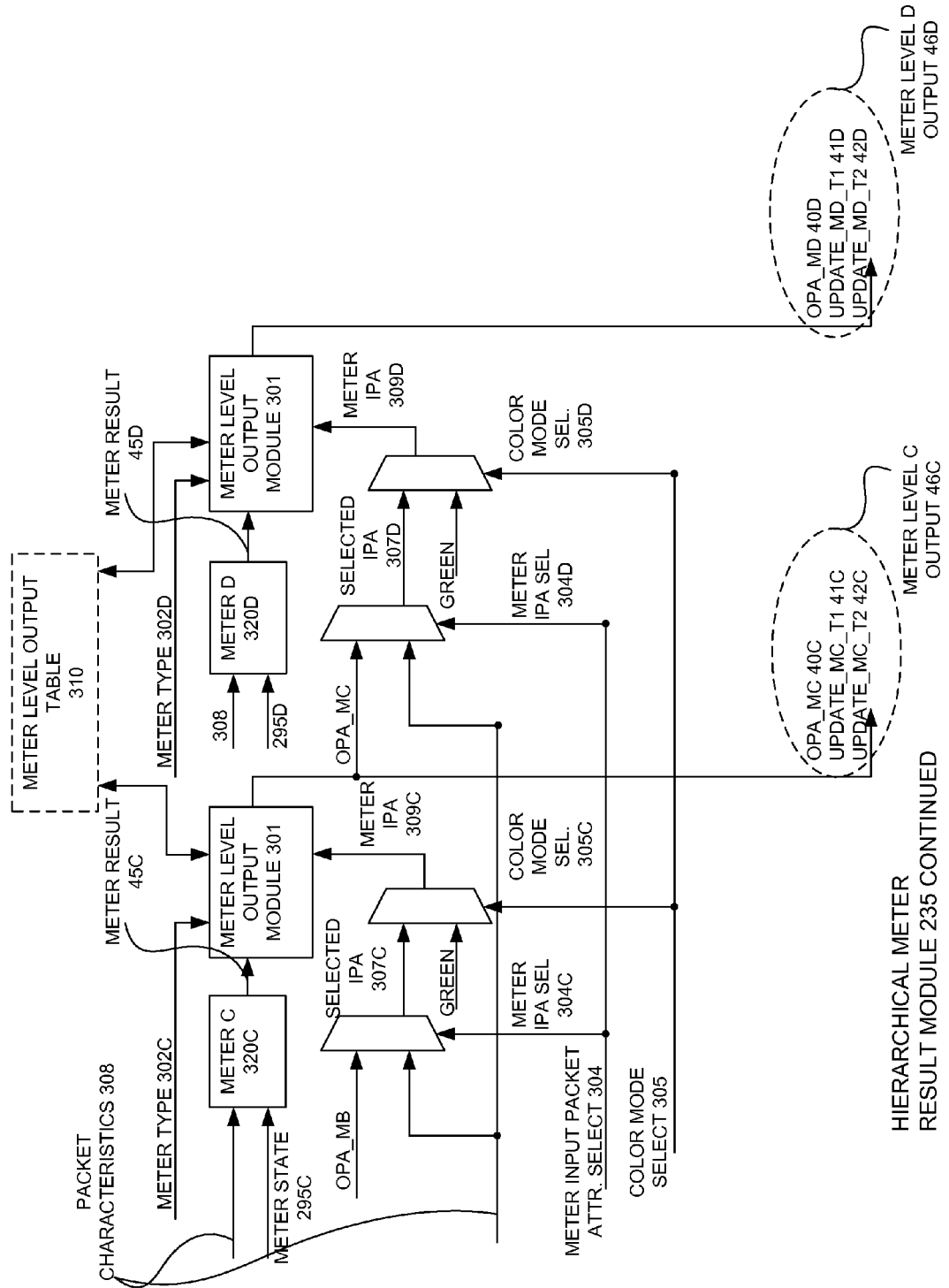

FIGS. 3A and 3B are block diagrams illustrating a plurality of levels of a hierarchical meter result module to be configured into a hierarchy of meter levels according to a packet policing request according to embodiments of the invention. The figures such that 3A and 3B combine to form one figure illustrating a four level embodiment of hierarchical meter result module. Some modules are optional and are shown with dashed boxes as such. Furthermore, FIGS. 3A and 3B use dashed ovals to logically group sets of inputs, outputs, and modules.

In FIGS. 3A and 3B, the hierarchical meter result module (HMRM) 235 has a plurality of meter levels including an initial level and one or more subsequent levels. Each meter level includes a meter 320A-320D, a meter IPA select module 330A-330D, and makes use of a common meter level output module 301. The operation of the HMRM 235 performs the traversing step of FIG. 1 (Block 150) and generates the set of meter level outputs 46A-46D.

The HMRM 235 receives a plurality of meter profiles 30A-30D to configure the plurality of meter levels. Each meter profile 30A-30D is comprised of a meter type 302A-302D, a meter input packet attribute (IPA) select 304A-304D, and a color mode select 305A-305D. In FIG. 3, meter profile 30A is illustrated as three dashed ovals grouping together meter type 302A, meter IPA select 304A, and color mode select 305A; meter profiles 30B-30D are not illustrated to avoid unnecessary confusion in the figure. Furthermore, the HMRM 235 receives a plurality of meter states 295A-295D and packet characteristics 308.

The HMRM feeds each meter state 295A-295D into a corresponding meter 320A-320D along with packet characteristics 308. Each meter 320A-320D operates as described above with reference to FIG. 4 to generate meter results 45A-45D. In at least one embodiment, the meters at the subsequent levels B-D receive the packet characteristics 308 from the previous meter along with a packet size adjustment that increases or decreases the packet size used in the meter for that level. In this way meter 320B receives the packet size from meter 320A along with an adjustment, meter 320C receives the packet size from meter 320B along with an adjustment, and meter 320D receives the packet size from meter 320C along with an adjustment.

The HMRM uses meter IPA select modules 330A-330D to generate meter IPAs 307A-307D. The meter IPA select modules 330A-330D (330B is illustrated in FIG. 3A as a dashed oval surrounding two multiplexers) uses the meter IPA selects 304A-304D and color mode selects 305A-305D along with the packet characteristics 308 to generate meter IPAs 307A-307D. With reference to the initial level A, the meter IPA select 304A is feed into a multiplexer to generate a selected IPA 307A, which is chosen between two potential inputs. At the initial level A, both inputs are identical and are assigned to an IPA contained within the packet characteristics 308. The IPA contained in the packet characteristics 308 indicates a pre-color for the packet; either RED, YELLOW, or GREEN. Prior to making the policing request, modules external to the hierarchical policer module 210 may pre-color the packet according to well known methods. For example, packets that carry voice traffic may be pre-colored green to indicate a higher priority and to bias the policer away from marking the packet RED. On the other hand, packets that carry data traffic may be pre-colored yellow to indicate no bias towards a final packet color. At subsequent meter levels B-D, the corresponding selected IPA 307B-307D is chosen between a meter level output packet attribute (OPA) 40A-40C of the previous meter level and the IPA contained within the packet characteristics 308. This choice is made based on the meter IPA select 304B-304D. In this way meter levels B-D may be configured to take into account the coloring of the OPA 40A-40C from the previous level or use the initial coloring for the IPA of the packet characteristics in generating that meter level's OPA 40B-40D.

The selected IPA 307A-307D and a GREEN IPA are feed into a second multiplexer and are chosen between based on the color mode selector 305A-305D. If the color mode select 305A-305D indicates a color-aware mode, then the selected IPA 307A-307D is chosen as the meter IPA 309A-309D. If the color mode select 305A-305D indicates a color-blind mode, then the GREEN IPA is chosen as the meter IPA 309A-309D. In this way each meter level A-D may be configured to take into account pre-color biasing or to ignore pre-color biasing by assuming the packet was pre-colored GREEN.

The HMRM 235 then feeds meter result 45A-45D, meter type 302A-302D, and meter IPA 309A-309D into the meter level output module 301. The meter type 302A-302D is a field used to indicate which algorithm the meter level output module 301 will use to generate the meter level output 46A-46D. In one embodiment, the meter type 302A-302D indicates which metering standard is being used for a meter level, e.g. single rate three-color meters (RFC 2697) and two rate three-color meters (RFC 2698, RFC 4115, or MEF 10.2). In another embodiment, the meter 302A-302D indicates a custom algorithm being used for a meter level. The meter level output module 301 uses the meter type 302A-302D, the meter IPA 309A-309D, and the meter result 46A-46D to generate a meter level output 45A-45D that includes a meter level OPA 40A-40D and meter token state update indicators 41A-41D and 42A-42D for each of the plurality of tokens. Each meter level OPA 40A-40C is feed into a subsequent level's meter IPA select module 330B-330D. The meter token state update indicators 41A-41D and 42A-42D specify which tokens should be updated according to the meter level output module 301. In one embodiment, the OPA 40A-40D indicates one of three packet colors (GREEN, YELLOW, RED) for a meter level, while in another embodiment the OPA 40A-40D utilizes an alternative coloring scheme (BLUE, PURPLE, ORANGE). Alternatively, the OPA 40A-40D can indicate a different packet classification system such as numerically (1, 2, 3, 4, 5)

By way of example, if a policer request indicates that meter level is conforming to RFC 2698 according the meter type 302A then the meter level output module 301 may set contents the meter level output 46A in the following manner. If the meter IPA 309A is set to RED or if the meter result 45A bit corresponding to the check against the PBS token fails, then the meter level OPA 40A is set to RED and the first meter token state update indicator 41A and the second meter token state update indicator 42A are set to false (no update indicated). If the meter IPA 309A is set to YELLOW or if the meter result 45A bit corresponding to the check against the PIR token fails while the meter result 45A bit corresponding to the check against the PBS token passes, then the meter level OPA 40A is set to YELLOW and the first meter token state update indicator 41A is set to true and the second meter token state update indicator 42A is set to false (update indicated for PBS token only). If the meter IPA 309A is set to GREEN and the meter result 45A bits corresponding to the check against the PIR token and the check against the PBS token both pass, then the meter level OPA 40A is set to GREEN and both meter token state update indicators 41A and 42A are set to true.

Further example may be gained by describing how a meter level may operate if conforming to RFC 4115, as specified by meter type 302B. If the meter IPA 309B is set to RED, then the meter level OPA 40B is set to RED and both meter token state update indicators 41B and 42B are set to false (no update indicated). If the meter IPA 309B is set to YELLOW and the if the meter result 45B bit corresponding to the check against the EBS token fails, then the meter level OPA 40B is set to RED and both meter token state update indicators 41B and 42B are set to false (no update indicated). If the meter IPA 309B is set to YELLOW and the if the meter result 45B bit corresponding to the check against the EBS token passes, then the meter level OPA 40B is set to YELLOW and the first meter token state update indicator 41B (corresponding to an update to EBS) is set true while the second meter token state update indicator 42B (corresponding to an update to CBS) is set to false. If the meter IPA 309B is set to GREEN and if the meter result 45B bit corresponding to the check against the CBS token passes, then the meter level OPA 40B is set to GREEN and the first meter token state update indicator 41B (corresponding to an update to EBS) is set false while the second meter token state update indicator 42B (corresponding to an update to CBS) is set to true. If the meter IPA 309B is set to GREEN and if the meter result 45B bit corresponding to the check against the CBS token fails while the meter result 45B bit corresponding to the check against the EBS token passes, then the meter level OPA 40B is set to YELLOW and the first meter token state update indicator 41B (corresponding to an update to EBS) is set true while the second meter token state update indicator 42B (corresponding to an update to CBS) is set to false. If the meter IPA 309B is set to GREEN and the if the meter result 45B bits corresponding to the check against the CBS token and the EBS token both fails, then the meter level OPA 40B is set to RED and both meter token state update indicators 41B and 42B are set to false.

In one embodiment, the operation of meter level output module 301 is a table lookup. In this embodiment, the meter level output module 301 uses the meter result 45, meter type 302, and meter IPA 309 to generate an address into a meter level output table 310. The meter level output table 310 holds an entry indicating the value of a meter level OPA 40 and meter token state update indicators 41 and 42 for given combinations of the meter result 45, meter type 302, and meter IPA 309. For example, the meter result 45 is a two bit value, each bit indicating a pass or fail of one of the token comparisons as described with reference to FIG. 4. Furthermore, the meter type 302 is a four bit value allowing for up to sixteen defined meter types; i.e. meters complying with various standards such as RFC 2697, RFC 2698, RFC 4115, and MEF10.2. The following table shows a plurality of entries in a meter level output table 310 illustrating exemplary inputs and outputs. In the following table, RFC 2698 is meter type 0000 while RFC 4115 is meter type 0001. With reference to RFC 2698, the low order bit for meter result 45 represents the result of the comparison with the PBS token and the high order bit represents the result of the comparison with the PIR token. While compared to RFC 4115, the low order bit for meter result 45 represents the result of the comparison with the CBS token and the high order bit represents the result of the comparison with the EBS token. Finally, the meter IPA 309 and meter level OPA 40 are three bit values where GREEN is 111, YELLOW is 010, and RED is 000. In such a case the combination of the three inputs creates a nine bit address where the first four high order bits are the meter type 302, the next three bits are the meter IPA 309, and the low order two bits are the meter result 45. In other embodiments, the meter type 302, meter IPA 309, and meter result 45 may be in a different order to generate an index into the meter level output table 310 and/or may be different lengths to accommodate more or less input possibilities. As well, the meter level OPA 40 and update indicators 41 and 42 may have more or less bits to accommodate other configurations of outputs.

TABLE 1

Illustrating Exemplary Entries in Meter Level Output Table 310

| Inputs | | | Outputs (METER LEVEL OUTPUT 46) | | |
|---|---|---|---|---|---|
| METER TYPE 302 | METER IPA 309 | METER RESULT 45 | METER LEVEL OPA 40 | FIRST METER TOKEN STATE UPDATE INDICATOR 41 | SECOND METER TOKEN STATE UPDATE INDICATOR 42 |
| (RFC 2698) | (RED) | (PIR)/(PBS) | (RED) | (PIR) | (PBS) |
| 0000 | 000 | 00 | 000 | 0 | 0 |
| 0000 | 000 | 01 | 000 | 0 | 0 |
| 0000 | 000 | 10 | 000 | 0 | 0 |
| 0000 | 000 | 11 | 000 | 0 | 0 |
|  | (YELLOW) | (PIR)/(PBS) | (RED) | (PIR) | (PBS) |
| 0000 | 010 | 00 | 000 | 0 | 0 |
| 0000 | 010 | 10 | 000 | 0 | 0 |
|  |  |  | (YELLOW) |  |  |
| 0000 | 010 | 01 | 010 | 0 | 1 |

TABLE 1-continued

Illustrating Exemplary Entries in Meter Level Output Table 310

| Inputs | | | Outputs (METER LEVEL OUTPUT 46) | | |
|---|---|---|---|---|---|
| | | | | FIRST METER TOKEN | SECOND METER TOKEN |
| METER TYPE 302 | METER IPA 309 | METER RESULT 45 | METER LEVEL OPA 40 | STATE UPDATE INDICATOR 41 | STATE UPDATE INDICATOR 42 |
| 0000 | 010 (GREEN) | 11 (PIR)/(PBS) | 010 (RED) | 0 (PIR) | 1 (PBS) |
| 0000 | 111 | 00 | 000 | 0 | 0 |
| 0000 | 111 | 10 | 000 (YELLOW) | 0 | 0 |
| 0000 | 111 | 01 | 010 (GREEN) | 0 | 1 |
| 0000 (RFC 4115) | 111 (RED) | 11 (EBS)/(CBS) | 111 (RED) | 1 (EBS) | 1 (CBS) |
| 0001 | 000 | 00 | 000 | 0 | 0 |
| 0001 | 000 | 01 | 000 | 0 | 0 |
| 0001 | 000 | 10 | 000 | 0 | 0 |
| 0001 | 000 | 11 | 000 | 0 | 0 |
| | (YELLOW) | (EBS)/(CBS) | (RED) | (EBS) | (CBS) |
| 0001 | 010 | 00 | 000 | 0 | 0 |
| 0001 | 010 | 01 | 000 (YELLOW) | 0 | 0 |
| 0001 | 010 | 10 | 010 | 1 | 0 |
| 0001 | 010 (GREEN) | 11 (EBS)/(CBS) | 010 (GREEN) | 1 (EBS) | 0 (CBS) |
| 0001 | 111 | 01 | 111 | 0 | 1 |
| | | 11 | 111 (YELLOW) | 0 | 1 |
| 0001 | 111 | 10 | 010 (RED) | 1 | 0 |
| 0001 | 111 | 00 | 000 | 0 | 0 |

While Table 1 shows table inputs and output corresponding to RFCs 2698 and 4115, other embodiments may contain more or less entries in the meter level output table 310. For example, entries may include custom entries corresponding to meter profiles developed by network service provides or entries may include other standardized meters such as RFC 2697 and MEF 10.2.

Figure 5:
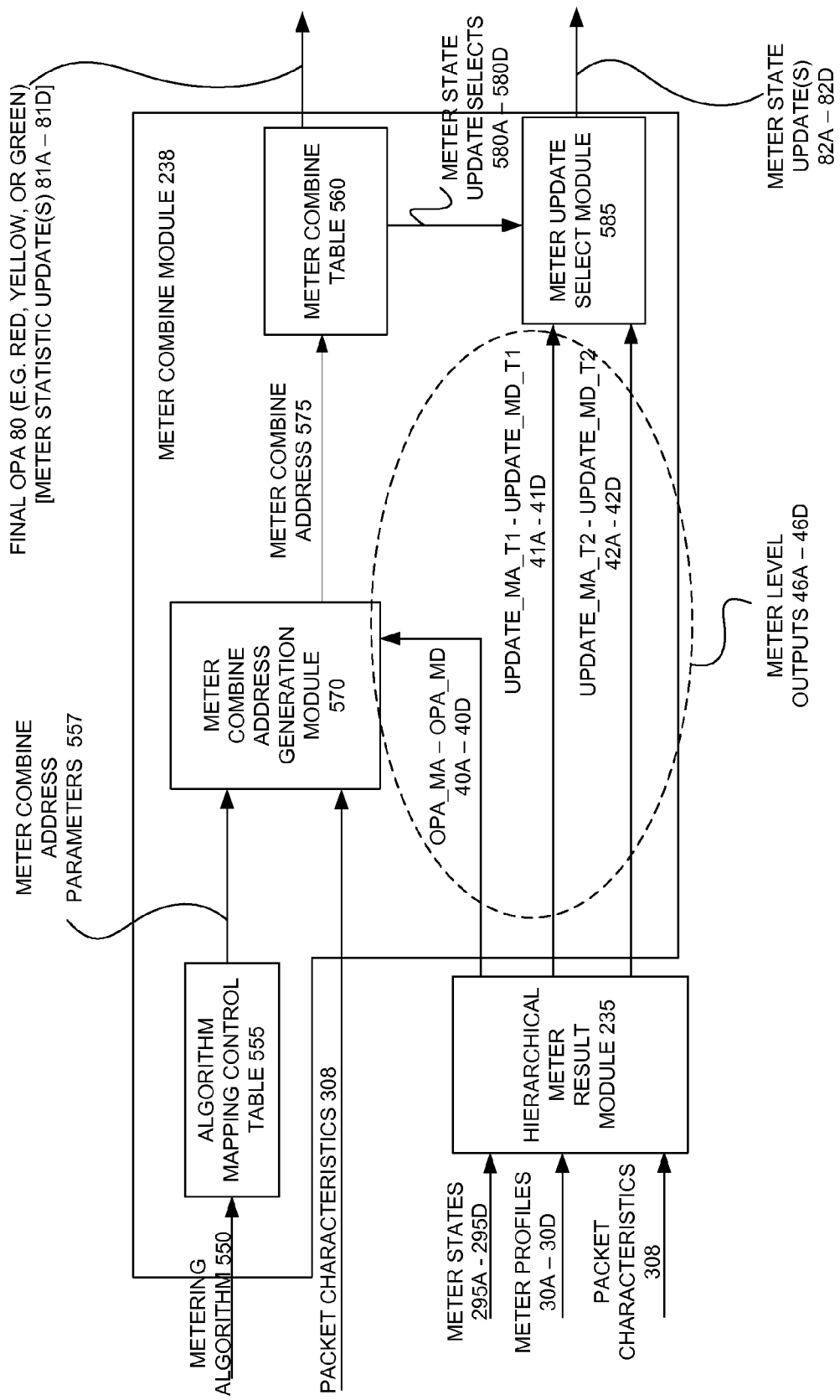
FIG. 5 is a block diagram illustrating a meter combine module including an algorithm mapping control table, a meter combine address generation module, and a meter combine table according to embodiments of the invention.

FIG. 5 is a block diagram illustrating a meter combine module (MCM) 238 including an algorithm mapping control table 555, a meter combine address generation module 570, and a meter combine table 560 according to embodiments of the invention. The meter level outputs 46A-46D and a metering algorithm 550 are communicated to the MCM 238. The metering algorithm 550 is identified by the request configuration information contained within the policer request 205. The metering algorithm 550 is used to determine how the meter level outputs 46A-46D should be combined to generate a final OPA 80 and the meter state updates 82A-82D. In one embodiment, the MCM 238 further utilizes the metering algorithm 550 to determine meter statistic updates 81A-82A.

The MCM 238 uses the metering algorithm 550 to retrieve a plurality of meter combine address parameters 557 from an algorithm mapping control table 555. In one embodiment, the meter combine address parameters 557 include force IPA/OPA bits 557A parameters, IPA/OPA mask 557B parameters, and a base address 557C. In other embodiments the meter combine address parameters 557 include more or less information, for example it includes a function select 557D parameter. A meter combine address generation module 570 uses the meter combine address parameters 557, the packet characteristics 308, and the meter level OPAs 40A-40D to generate a meter combine address 575.

Figure 6:
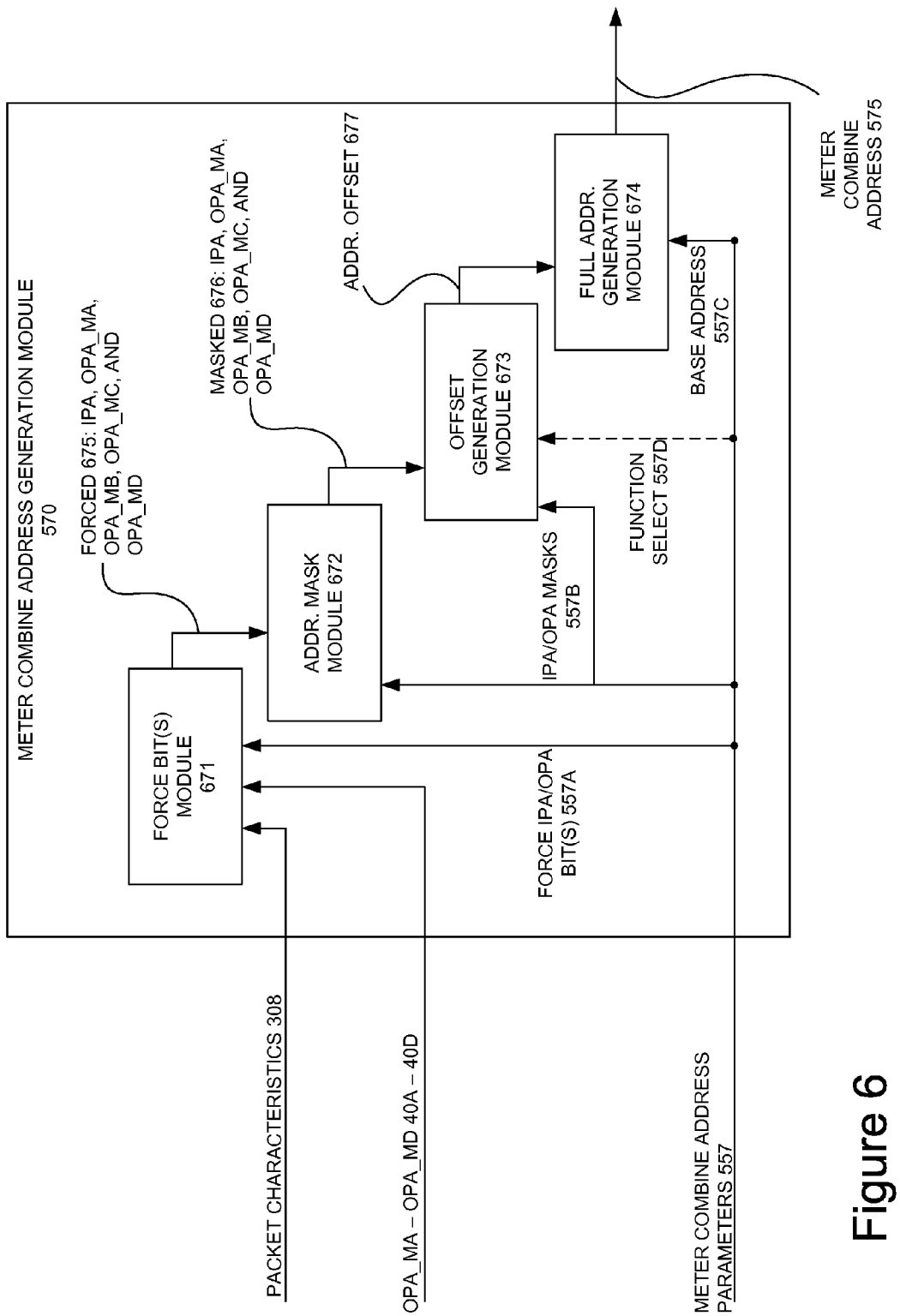
FIG. 6 is a block diagram illustrating a meter combine address generation module of the meter combine module according to embodiments of the invention.

FIG. 6 is a block diagram illustrating a meter combine address generation module 570 of the MCM 238 according to embodiments of the invention. The meter combine address generation module 570 has a force bits module 671 that generates forced IPA/OPAs 675. Furthermore the meter combine address generation module 570 has an address mask module 672 and offset generation module 673 that generate masked IPA/OPAs 676 and an address offset 677 correspondingly. Finally, the meter combine address generation module 570 has a full address generation module that utilizes the base address 557C and the address offset 677 to generate a meter combine address 575.

The force bits module 671 uses the IPA from the packet characteristics 308 and the meter level OPAs 40A-40D along with the force IPA/OPA parameters 557A. The force IPA/OPA parameters 557A includes a plurality of fields that each correspond to either the IPA or one of the meter level OPAs 40A-40D and each field has the same number of bits as its corresponding IPA/OPA. With reference to the three bit examples of the IPA and the meter level OPAs from FIGS. 3A and 3B, the fields in the force IPA/OPA parameters 557A are three bits. In one embodiment, each bit in the fields that is set to a 1 corresponds to a bit in the IPA or meter level OPAs 40A-40D that should be forced to a 0. By way of example, if the IPA is GREEN '111' and the force IPA parameter is '010' then the forced IPA would be '101'. In another embodiment, each bit in the fields that is set to a 1 corresponds to a bit in the IPA or meter level OPAs 40A-40D that should be forced to a 1. In another embodiment two force parameters are included for each of the IPA and OPAs, one parameter to indicate bits to be forced to 0 and the other parameter to indicate bits to be forced to 1. In embodiments that use two parameters for each of the IPA and OPAs, one of the two parameters would take precedent such that in one case if both the force to 0 and the force to 1 bits were set then the force to 1 would take precedent while in another case if both the force to 0 and the force to 1 bits were set the force to 0 would take precedent. The forced IPA/OPAs 676 are then output to the address mask module 672.

The address mask module 672 utilizes the forced IPA/OPAs 675 combined with a plurality of IPA/OPA mask parameters 557B. Similar to the forced IPA/OPA parameters 557A, there is a mask parameter corresponding to each of the IPA and OPAs that is the same size as the corresponding IPA and OPAs. The forced IPA/OPAs 675 are logically ANDed with their corresponding IPA/OPA mask parameter 557B. Using the example from the force bit module 671 description, if the forced IPA is '101' and the IPA mask parameter is '110' then the masked IPA is '001'. The masked IPA/OPAs 676 are then output to offset generation module 673.

The offset generation module 673 utilizes the masked IPA/OPAs 676 along with the IPA/OPA mask parameters 557B to generate the address offset. In one embodiment the offset generation module 673 concatenates the masked IPA/OPAs 676 into an address offset. The masked IPA corresponds to the low order bits of the address offset while meter level A's masked OPA corresponds to the next lowest order bits. Each of the subsequent meter level's masked OPA corresponds to the next lowest order of the remaining bits such that meter level D's masked OPA corresponds to the highest order bits of the address offset. In one embodiment, the address offset has fewer bits then all of the bits in the IPA and OPAs so that during concatenation only bits with a corresponding mask bit set to 1 are included the address offset and bits with a 0 in its corresponding mask are skipped. Thus, the number of mask IPA/OPA parameter bits set to 1 may be less than or equal to the size of the address offset. In another embodiment, the offset generation module 673 receives another parameter, a function select parameter 557D that indicates one of a plurality of functions to be performed to generate the address offset. In one embodiment, the function select parameter 557D specifies one of the following functions: select the minimum of the masked IPA/OPAs 676, select the maximum of the masked IPA/OPAs 676, or concatenate the masked IPA/OPAs 676. Other embodiments may include more or less functions among the selection such as: logically AND the masked IPA/OPAs 676, logically OR the masked IPA/OPAs 676, and perform no operation (just output a preconfigured address offset). The offset generation module 673 then outputs the address offset 677 to the full address generation module 674.

The full address generation module utilizes the base address parameter 557C and the address offset 677 to generate the meter combine address 575. The base address parameter 557C and the address offset 677 are logically ANDed together to come up with the meter combine address 575. Referring back to FIG. 5, the meter combine address generation module 570 then outputs the meter combine address 575 to the meter combine table 560.

The MCM 238 then uses the meter combine address 575 to retrieve a corresponding set of meter state update selects 580A-580D and a final OPA 80 from the meter combine table 560. In one embodiment, the MCM 238 also retrieves the set of meter statistic updates 81A-81D from the meter combine table 560.

The MCM 238 then uses the meter state update selects 580A-580D and the sets of one or more meter token state update indicators 41A-41D and 42A-42D to generate a plurality of meter state updates 82A-82D. By way of example, the meter state update selects 580A-580D indicate that meter level B updates should occur but that meter level A, C, and D updates should not occur (e.g. by setting meter state update select 580B to true and 580A, 580C, and 580D to false). In this example, the meter state update indicators 41B and 42B are used to generate a meter state update 82B while 82A, 82C, and 82D indicate no other updates should be performed. In this way, the meter state that was used by the meter 320B in level B of the HMRM will be updated by the policer control module 220 while the other meter states used by the remaining meters will not be updated regardless of the state of their corresponding meter state update indicates 41/42A, 41/42C, and 41/42D.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms.

Alternative Embodiments

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed in a packet processor core for policing a packet through a hierarchical policer having a plurality of meter levels including an initial level and one or more subsequent levels, the hierarchical policer coupled to one or more policing requestors, the method comprising the steps of:
   receiving, from one of the policing requestors, a policer request to perform hierarchical packet policing, wherein the policer request comprises packet characteristics and identifies request configuration information;
   at each meter level:
      creating a meter result using the packet characteristics and a meter state specified by the request configuration information, and
      generating a meter level output that includes a meter level output packet attribute that classifies the packet and a set of one or more meter token state update indicators, the meter level output based on the meter result for that level and a portion of the request configuration information, wherein for at least one of the subsequent levels the meter level output is further based on the meter level output packet attribute from a previous meter level;
   performing a meter update combine, comprising the steps of:
      producing a final packet output attribute that classifies the packet using at least one of the plurality of meter level output packet attributes and a portion of the request configuration information,
      producing a set of one or more meter state updates that indicate changes to one or more meter states using at least one of the plurality of sets of meter token state update indicators and a portion of the request configuration information;
   processing the set of meter state updates, wherein one or more meter states are changed as indicated by the meter state updates; and
   returning the final packet output to the policing requestor whereby hierarchical packet policing may be implemented in hardware but configured in a flexible manner by the policing requestors.

2. The method of claim 1, wherein the packet characteristics includes an input packet attribute that indicates a packet classification and wherein the step of generating a meter level output further comprises the step of:
   choosing a selected input packet attribute at one or more of the subsequent levels, wherein the choice is between the input packet attribute and a meter level output packet attribute included in the meter level output of a previous one of the plurality of meter levels.

3. The method of claim 2, wherein the step of generating a meter level output further comprises the step of:
   selecting, at one or more of the plurality of meter levels, between a color-aware mode and a color-blind mode, wherein:
      the color-aware mode indicates that a packet color included in the selected input packet attribute for that meter level is taken into account when producing the meter level output for that level, and
      the color-blind mode indicates that the packet color is not taken into account when producing the meter level output for that meter level.

4. The method of claim 1, wherein the request configuration information further indicates a metering algorithm and wherein the step of performing the meter update combine further comprises the steps of:
   mapping the metering algorithm to a set of one or more meter update combine address parameters;
   generating a meter update combine address using the set of meter update combine address parameters, a portion of the packet characteristics, and at least one of the plurality of meter level output packet attributes;
   mapping the meter update combine address to the final output packet attribute; and
   generating the set of one or more meter state updates using at least one of the sets of meter token state update indicators and the meter state update link address.

5. The method of claim 1, further comprising the steps of:
   retrieving a plurality of meter profiles, identified by the request configuration information, from a meter profiles tables, each meter profile for configuring at least a portion of each meter level and indicating a meter type, a meter input packet selector, and a color-mode selector;
   wherein the meter level output for each meter level is further based on the meter profile corresponding to that meter level.

6. The method of claim 1, wherein the packet characteristics comprise a packet size and the step of creating a meter result further comprises the step of:
   comparing the packet size to at least one token stored in the meter state for that meter level.

7. The method of claim 1, further comprising the steps of:
   checking a meter state cache for the presence of each meter state;
   retrieving, from the meter cache, each meter state found in the meter cache;
   retrieving, from a meter state memory, each meter state not found in the meter cache; and
   loading, into the meter state cache, each meter state retrieved from the meter state memory.

8. A hierarchical policer module, coupled to one or more policing requestors, to police a packet through hierarchical packet policing, the hierarchical policer module comprising:
   a policer control module configured to:
      receive policer requests that originate from policing requestors, each policer request to include packet characteristics and to include request configuration information,
      retrieve a plurality of meter states, each meter state to be specified by the request configuration information and to be comprised of meter tokens each token to indicate an amount of available resources for that meter state, transmit the plurality of meter states and the packet characteristics to a hierarchical meter result module and a meter update combine module, and transmit a policer response to the policing requestor, the policer response indicating, at least, a packet classification;

the hierarchical meter result module, coupled to the policer control module, to be configured to chain together a plurality of meter levels including an initial level and one or more subsequent levels according to the request configuration information, each meter level configured to:

generate a meter result for that level with one of the plurality of meter states and a portion of the packet characteristics;

generate a meter level output based on, at least in part, the meter result and a portion of the request configuration information, the meter level output to include a meter level output packet attribute to classify the packet and a set of one or more meter token state update indicators, wherein for at least one of the subsequent levels the meter level output is further based on the meter level output packet attribute from a previous meter level; and the meter update combine module, coupled to the policer control module and the hierarchical meter result module, the meter update combine module configured to:

generate a final packet output attribute with at least one of the plurality of meter level output packet attribute, the final packet attribute to classify the packet, and generate, with at least one of the sets of meter token state update indicators, a set of one or more meter state updates to indicate changes to one or more meter states;

whereby hierarchical packet policing may be implemented in hardware but configured in a flexible manner by the policing requestors.

9. The hierarchical policer module of claim 8, further comprising a meter state cache configured to cache a one or more meter states and wherein the hierarchical policer module is further coupled to meter state memory to store meter states, the hierarchical policer module further configured to:

check the meter state cache for the presence of each of the plurality of meter states;

retrieve, from the meter cache, each meter state found in the meter cache;

retrieve, from meter state memory, each meter state not found in the meter cache; and load, into the meter state cache, each meter state retrieved from meter state memory.

10. The hierarchical policer module of claim 8, further comprising a meter profiles table configured to store a plurality of meter profiles, wherein the policer control module is further configured to:

retrieve, from a meter profiles table, a plurality of meter profiles identified by the request configuration information; and transmit the plurality of meter profiles to the hierarchical meter result module, each meter profile to be used by one of the plurality of meter levels to indicate a meter type, a meter input packet selector, and a color-mode selector.

11. The hierarchical policer module of claim 8, wherein the hierarchical meter result module further comprises:

at each meter level, a meter input packet attribute select module to select a meter input packet attribute for that level, the meter input packet attribute select module configured to:

at the initial level, use an input packet attribute, included in the packet characteristics, as the meter input packet attribute for that level, at each of the subsequent levels, select, as the meter input packet attribute for that level, between the input packet attribute and a meter level output packet attribute included in the meter level output of a previous one of the plurality of meter levels.

12. The hierarchical policer module of claim 11, wherein the hierarchical meter result module further comprises a meter level output module configured to generate, for each of the plurality of meter levels, the meter level output for that meter level based upon the meter result for that level, the meter input packet attribute for that level, and a portion of the request configuration information.

13. The hierarchical policer module of claim 11, wherein the meter input packet attribute module is further configured to select between a color-aware mode and a color-blind mode, wherein:

the color-aware mode is to indicate that a packet color included in the selected input packet attribute for that meter level is to be taken into account when the meter level output packet attribute for that level is produced, and the color-blind mode is to indicate that the packet color is not to be taken into account when the meter level output packet attribute for that meter level is produced.

14. The hierarchical policer module of claim 8, wherein the request configuration information is to identify a metering algorithm and the meter update combine module is comprised of:

an algorithm mapping control table configured to map the metering algorithm to a set of one or more meter update combine address parameters;

a meter update combine address generation module, coupled to the algorithm mapping table, configured to generate a meter update combine address with the set of one or more meter update combine address parameters, the packet characteristics, and at least one of the plurality of meter level output packet attributes;

a meter update combine table, coupled to the meter update combine address generation module, configured to:

map the meter update combine address to a final output packet attribute, the final output packet attribute to classify the packet, and map the meter update combine address and at least one of the plurality of meter level outputs to one or more meter state updates, the meter state updates to indicate changes to one or more meter states.

* * * * *

UNITED STATES PATENT AND TRADEMARK OFFICE
CERTIFICATE OF CORRECTION

PATENT NO. : 8,537,671 B2  
APPLICATION NO. : 12/983111  
DATED : September 17, 2013  
INVENTOR(S) : Alleyne et al.

Page 1 of 1

It is certified that error appears in the above-identified patent and that said Letters Patent is hereby corrected as shown below:

In the Specification

In Column 5, Line 63, delete "policer requestor" and insert -- policing requestor --, therefor.

In Column 6, Line 13, delete "policer requestors" and insert -- policing requestors --, therefor.

In Column 8, Line 53, delete "meter result 46A-46D" and insert -- meter result 45A-45D --, therefor.

In Column 8, Line 54, delete "meter level output 45A-45D" and insert -- meter level output 46A-46D --, therefor.

Signed and Sealed this  
Eighteenth Day of February, 2014

Michelle K. Lee  
*Deputy Director of the United States Patent and Trademark Office*